Patented May 17, 1932

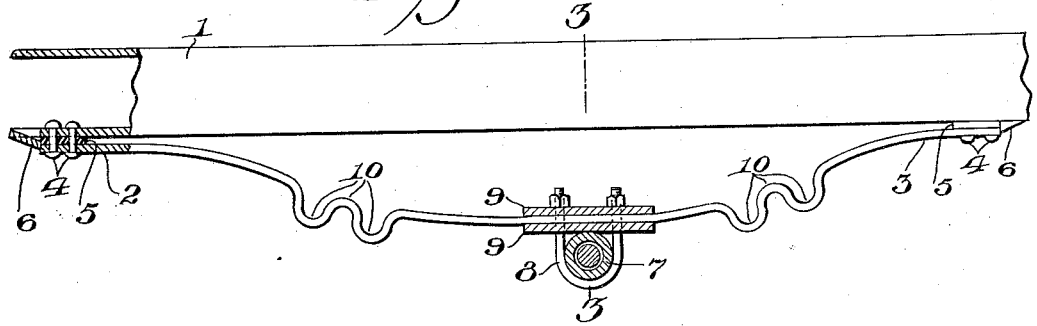
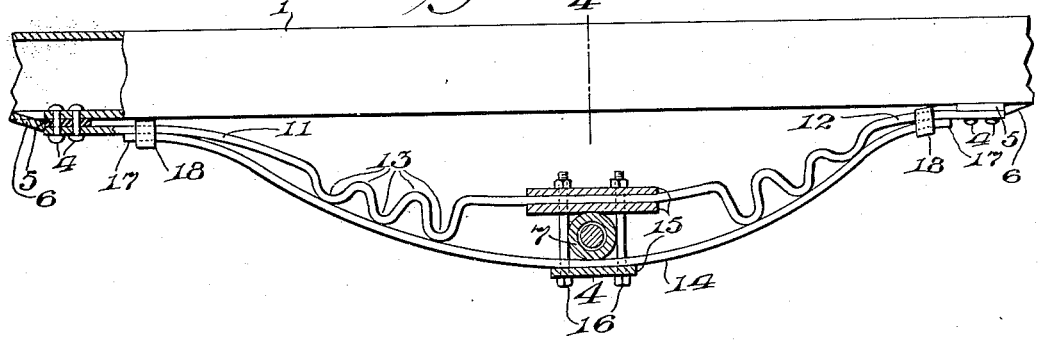
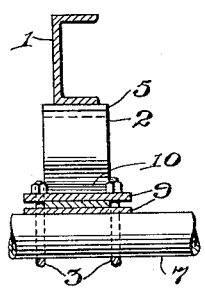
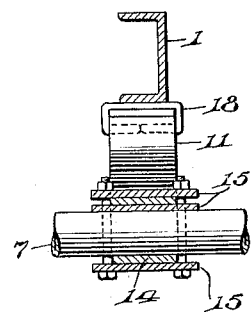
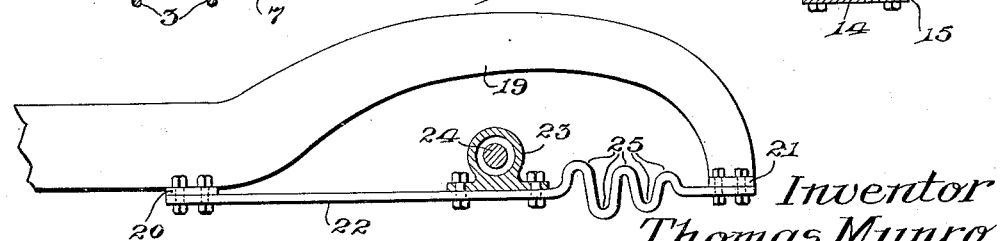

1,859,105

UNITED STATES PATENT OFFICE

THOMAS MUNRO, OF PHILADELPHIA, PENNSYLVANIA

SPRING SUSPENSION OF VEHICLES

Application filed May 7, 1929. Serial No. 361,174.

The object of the invention is to provide improvements in vehicle supporting springs and especially those designed to support passenger or other vehicles in such manner as to insure the utmost comfort in riding.

In the case of most if not all such springs, they are composed of a plurality of leaves adapted to slide with respect to one another as the spring as a unit flexes, one or both of the opposite ends of the longest leaf being connected by means of a shackle to the chassis frame.

In contradistinction to this prevailing spring structure, the present invention provides for the use of a single spring leaf of suitable thickness and relatively great width, so that at once all of the usual retardation or sluggishness of action due to friction between the several leaves of an ordinary spring is eliminated, while the ends of the single spring leaf are fixedly secured preferably through the medium of sound-deadening material direct to the chassis frame and the leaf being provided with one or more corrugations of preferably equal or regular curvature upon each of the opposite sides of the intermediate point of the spring to which the axle is secured, for the purpose of providing for and controlling the elongation and contraction of the spring as its curvature is increased and decreased during the rise and fall of the vehicle upon its axle.

The result of this construction, especially when the sections of the spring leaf upon the opposite sides of the axle are of different lengths, is to insure an ease of riding over springs now in common use and comparable with the advantages of low pressure balloon tires over the earlier types of relatively high pressure tires, at the same time eliminating all wear and sound arising from the usual shackle connections, while maintaining a substantially fixed transverse position of the axle with respect to the chassis frame and consequently maintaining a fixed distance from the axle or differential from the engine and power transmission units of the usual motor car, as the axle or differential rises and falls in accordance with irregularities of the road surface and differences in the loads carried.

In the modification of the invention, a spring leaf is employed having a plurality of corrugations upon the opposite sides of the point of attachment of the axle, and the amplitude of the corrugations of each series varying each regularity or irregularity in a given direction, while the load upon said spring leaf, if desired, may be partly shared by a second leaf preferably without corrugations, but also secured to the axle and at its end portions bearing slidably against said first leaf adjacent to the fixed end portions of the latter, while the second leaf also rests slidably against the apexes of the corrugations of said first leaf if so desired.

With these and other objects in mind, the present invention comprises further details of construction and operation, which are fully brought out in the following description when read in conjunction with the accompanying drawings, in which Fig. 1 is a diagrammatical view showing a fragmentary portion of a vehicle chassis frame and a spring comprising one embodiment of the invention connected operatively thereto; Fig. 2 is a modified form of the device; Fig. 3 is a vertical transverse section on the line 3—3 of Fig. 1; Fig. 4 is a similar section on the line 4—4 of Fig. 2; and Fig. 5 is a side elevation of a modified form of spring embodying the present invention.

Referring to Figs. 1 and 3, a portion of a chassis frame is shown as comprising a channel iron 1, to which the opposite end portions 2 and 3 of a single spring leaf are secured either fixedly or pivotally at 4, preferably through the medium of sound-deadening material 5, while in order to prevent a shearing force being applied by the spring to the fastening means portions 6 of the channel iron 1 may be deflected outwardly in such manner that the spring ends abut directly against them.

The axle or axle casing 7 is secured in any suitable manner, as for instance by means of the U-bolt 8 and oppositely positioned plates 9 to an intermediate portion of the spring leaf preferably to one side of the center of the leaf so that the leaf sections upon the opposite sides of said axle are of different lengths, with the result that they possess different periods of vibrations. It will then be noted that substantially the central portion of each of the sections of the spring is provided with either one or a series of corrugations 10 which, in this form of the invention, preferably possess a substantially constant degree of curvature or radius, so that as the axle rises and falls with respect to the chassis frame and the effective length of the spring leaf alternately increases and decreases, each of the said corrugations flexes so as to take up its proportionate share of the change in length of said spring.

With this construction, since the ends of the spring leaf are fixed with respect to the chassis frame, the rise and fall of the axle will under almost every condition remain in a substantially vertical plane, that is, a plane which is perpendicular to the general plane of the said chassis frame, with the result that the distance between the axle and the engine and the usual transmission gearing remains the same instead of increasing and decreasing with every up and down movement of the axle as is in general the case with the use of shackle mounts at either or both ends of the spring.

Furthermore, in addition to the spring sections being of different lengths, they may also be of different thicknesses or widths or both in order to carry out still further the general principle of providing in them different characteristic periods of vibrations. Likewise, the number and depth of the corrugations in the spring sections need not be identical if another relationship should be preferred.

Referring to Figs. 2 and 4, it will be noted that the spring sections 11 and 12 are provided each with corrugations 13 which vary in depth or amplitude progressively in a given direction so that in addition to the spring sections themselves being of different lengths and therefore having different natural periods of vibration, the corrugations themselves have different factors of resiliency in each spring section, a deeper corrugation, generally speaking, tendency to collapse more readily than a corrugation of less depth.

It will also be noted in this construction that a second or auxiliary spring leaf 14 is provided, which together with the principal leaf, is secured to the axle or axle casing 7 by means of suitably positioned plates 15 secured together and to said axle by means of bolts 16 or the like. This auxiliary leaf has its free end portions 17 bearing slidably against the under surfaces of the spring sections 11 and 12, while the adjacent end portions of the spring leaves are prevented from relative transverse motion by means of any suitable clips 18 or the like. Otherwise, the major spring leaf is mounted upon the chassis frame as hereinbefore described.

In the operation of this embodiment of the invention, the auxiliary leaf 14 carries a portion of the normal upper thrust of the axle 7 and distributes such thrust upon the opposite end portions of the major spring leaf beyond the series of corrugations 13. Additionally, if desired, this auxiliary leaf may rest upon the lower apexes of the corrugations of each series so that in particular cases a substantially predetermined shape or curvature of the major spring is preserved as the axle rises and falls so that there will be no tendency of said major spring flexing proportionately more in the regions of the corrugations than throughout its uncorrugated regions.

Referring to Fig. 5, the channel iron 19, comprising a part of the chassis frame is bowed upwardly and thence downwardly to provide a so-called "kick-up" terminating in spaced suporting portions 20 and 21, to which the opposite end portions of a leaf spring 22 are anchored either pivotally or rigidly, and in substantial alignment with the major portion of the frame. To the central region of said spring there is secured a bracket 23, normally supporting the axle 24, in any well-known manner. Said spring itself upon the forward side of the axle 24 is preferably straight so as to provide, in fact, a radius rod to maintain a fixed distance between the anchorage 20 and said axle, while the opposite situated portion of said spring is provided with a wavy section comprising a series of corrugations 25, which if preferred may decrease in amplitude as they progress in either or both directions.

This construction also eliminates the need for shackles and the axle 24 rises and falls about the anchorage 20 as an axis, while the ultimate contraction and elongation in the length of the spring is effected by the yielding nature of the corrugations 26. Furthermore, by making the forward portion of the spring straight, it serves to prevent the twisting of the axle with respect to the frame under braking and power stresses. Such constructions as those herein described, embodying as they do single leaf springs, provide the same road clearance as heretofore with a lower car frame and body, and likewise permit the lowering of the car without decreasing the amplitude of free play of the spring, or by retaining the same car height above the road surface greater amplitude of spring vibration is provided for.

Having thus described my invention, what I claim and desire to protect by Letters Patent of the United States is:—

1. The combination of a vehicle, with a spring having its opposite ends fixed with respect to and separated from said vehicle by a vibration-absorbing medium, an axle connected to an intermediate portion of said spring, the opposite portions of said spring being shaped so as to permit their respective overall lengths to vary with the rise and fall of said axle with respect to said vehicle, and a spring leaf also connected to said axle and with its free end portions bearing slidably against said first spring in the neighborhood of its fixed ends.

2. The combination of a vehicle, with a spring having its opposite ends fixed with respect to and separated from said vehicle by a vibration-absorbing medium, an axle connected to an intermediate portion of said spring so as to separate opposite spring portions of different natural periods of vibration, the opposite portions of said spring being shaped so as to permit their respective overall lengths to vary with the rise and fall of said axle with respect to said vehicle, and a spring leaf also connected to said axle and with its free end portions bearing slidably against said first spring in the neighborhood of its fixed ends.

3. The combination of a vehicle, with a spring having its opposite ends fixed with respect to and separated from said vehicle by a vibration-absorbing medium, an axle connected to an intermediate portion of said spring, the opposite portions of said spring being provided with corrugations to permit their respective overall lengths to vary with the rise and fall of said axle with respect to said vehicle, and a spring leaf also connected to said axle, extending across said corrugations and slidably cooperating with said spring between its corrugations and fixed ends.

4. The combination of a vehicle, with a spring having its opposite ends fixed with respect to and separated from said vehicle by a vibration-absorbing medium, an axle connected to an intermediate portion of said spring, the opposite portions of said spring being provided with corrugations of different amplitudes varying in a given direction to permit their respective overall lengths to vary with the rise and fall of said axle with respect to said vehicle, and a spring leaf also connected to said axle, extending across said corrugations and slidably cooperating with said spring between its corrugations and fixed ends.

In testimony whereof I have affixed my signature.

THOMAS MUNRO.